(12) United States Patent
Morrison et al.

(10) Patent No.: US 9,298,318 B2
(45) Date of Patent: Mar. 29, 2016

(54) INTERACTIVE INPUT SYSTEM AND METHOD

(75) Inventors: Gerald Morrison, Calgary (CA); John Newton, Auckland (NZ); Gareth Bell, Auckland (NZ)

(73) Assignee: SMART Technologies ULC, Calgary (CA)

( * ) Notice: Subject to any disclaimer, the term of this patent is extended or adjusted under 35 U.S.C. 154(b) by 130 days.

(21) Appl. No.: 13/309,377

(22) Filed: Dec. 1, 2011

(65) Prior Publication Data

US 2012/0139835 A1   Jun. 7, 2012

Related U.S. Application Data

(60) Provisional application No. 61/470,440, filed on Mar. 31, 2011.

(30) Foreign Application Priority Data

Dec. 1, 2010   (AU) ................................ 2010905278

(51) Int. Cl.
*G06F 3/033*   (2013.01)
*G06F 3/042*   (2006.01)

(52) U.S. Cl.
CPC ............ *G06F 3/0425* (2013.01); *G06F 3/0421* (2013.01)

(58) Field of Classification Search
CPC .................................................. G06F 3/0421
USPC .................................. 345/156, 173, 175, 419
See application file for complete search history.

(56) References Cited

U.S. PATENT DOCUMENTS

| | | | |
|---|---|---|---|
| 5,448,263 | A | 9/1995 | Martin |
| 6,141,000 | A | 10/2000 | Martin |
| 6,337,681 | B1 | 1/2002 | Martin |
| 6,747,636 | B2 | 6/2004 | Martin |
| 6,803,906 | B1 | 10/2004 | Morrison et al. |

(Continued)

FOREIGN PATENT DOCUMENTS

| WO | 03/063069 A2 | 7/2003 |
|---|---|---|
| WO | WO 03063069 A2 * | 7/2003 |

OTHER PUBLICATIONS

Alex Teiche et al: "Multi-Touch Technologies", May 31, 2009, pp. 1-89, Retrieved from the Internet: at <http://www. elvis. a c. nz/twikipub/Mai n/Multi-touch Table/multitouch-technologies.pdf> on Jun. 27, 2012.

(Continued)

*Primary Examiner* — Kathy Wang-Hurst
*Assistant Examiner* — Piejie Shen
(74) *Attorney, Agent, or Firm* — Katten Muchin Rosenman LLP

(57) ABSTRACT

An interactive input system comprises a display panel; a first illumination source providing illumination across an outer surface of the display panel such that when a pointer is brought into proximity with the outer surface, the pointer reflects illumination from the first illumination source through the display panel; at least one imaging device having a field of view aimed at an opposite outer surface of the display panel, the at least one imaging device capturing images including illumination reflected by the pointer through the display panel; and processing structure in communication with the at least one imaging device, said processing structure processing the captured images to determine a location of the pointer relative to the outer surface.

32 Claims, 14 Drawing Sheets

(56) References Cited

U.S. PATENT DOCUMENTS

| | | | |
|---|---|---|---|
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,515,143 B2* | 4/2009 | Keam et al. | 345/175 |
| 2003/0137494 A1* | 7/2003 | Tulbert | 345/173 |
| 2004/0179001 A1 | 9/2004 | Morrison et al. | |
| 2008/0122792 A1* | 5/2008 | Izadi et al. | 345/173 |
| 2009/0128508 A1* | 5/2009 | Sohn et al. | 345/173 |
| 2009/0190059 A1* | 7/2009 | Ra | 349/58 |
| 2011/0254809 A1* | 10/2011 | Yu et al. | 345/175 |
| 2012/0127084 A1* | 5/2012 | Large et al. | 345/173 |

OTHER PUBLICATIONS

Extended European Search Report for European Patent Application No. 11 844 356.3 mailed on May 8, 2015.

U.S. Appl. No. 61/470,420 to Hill, et al. filed Mar. 31, 2011, and entitled Method for Manipulating a Graphical Object and an Interactive Input System Employing the Same.

Transmittal; International Search Report; and the Written Opinion of the International Searching Authority for International Application No. PCT/CA2011/001316 wit a mailing date of Jan. 26, 2012.

* cited by examiner

INTERACTIVE INPUT SYSTEM AND METHOD

CROSS-REFERENCE TO RELATED APPLICATIONS

This application claims the benefit of U.S. Provisional Application No. 61/470,440 to Morrison, et al. filed on Mar. 31, 2011 and entitled "Interactive Input System", the entire content of which is incorporated herein by reference.

FIELD OF THE INVENTION

The present invention relates to an interactive input system and method.

BACKGROUND OF THE INVENTION

Interactive input systems that allow users to inject input such as for example digital ink, mouse events, etc., into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire contents of which are incorporated herein by reference; touch systems comprising touch panels employing electromagnetic, capacitive, acoustic or other technologies to register pointer input; tablet and laptop personal computers (PCs); personal digital assistants (PDAs) and other handheld devices; and other similar devices.

Above-incorporated U.S. Pat. No. 6,803,906 to Morrison, et al. discloses a touch system that employs machine vision to detect pointer interaction with a touch surface on which a computer-generated image is presented. A rectangular bezel or frame surrounds the touch surface and supports digital cameras at its four corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are then conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Both passive and active interactive input systems determine the location of physical contact between the touch surface and the pointer. Inputs from different pointers are typically treated in the same manner. Moreover, individual physical pointer contacts are the primary method by which input is provided to the display system employed by the interactive input systems. Unfortunately, this limits user interaction and makes multi-touch input interfaces difficult to implement. Moreover, known interactive input systems do not scale well, when much larger display sizes are required.

Although interactive input systems have been considered, improvements are sought. It is therefore an object of the present invention to provide a novel interactive input system and method.

SUMMARY OF THE INVENTION

Accordingly, in one aspect there is provided an interactive input system comprising a display panel; a first illumination source providing illumination across an outer surface of the display panel such that when a pointer is brought into proximity with the outer surface, the pointer reflects illumination from the first illumination source through the display panel; at least one imaging device having a field of view aimed at an opposite outer surface of the display panel, the at least one imaging device capturing images including illumination reflected by the pointer through the display panel; and processing structure in communication with the at least one imaging device, said processing structure processing the captured images to determine a location of the pointer relative to the outer surface.

According to another aspect there is provided a method comprising providing illumination generally across an outer surface of a display panel; capturing images of a pointer brought into proximity with the outer surface using at least one imaging device having a field of view aimed at an opposite outer surface of the display panel as a result of illumination from the first illumination source being reflected by the pointer towards the at least one imaging device; and processing the captured images to determine a location of the pointer.

According to another aspect there is provided an interactive input system comprising a display panel; at least a first illumination source providing illumination above an outer surface of the display panel; at least a second illumination source providing backlight illumination to an opposite outer surface of the display panel; at least one imaging device having a field of view aimed at the opposite outer surface, the at least one imaging device capturing images of at least one pointer brought into proximity with the outer surface of the display panel as a result of illumination from the first illumination source being reflected by the pointer through the display panel and towards the at least one imaging device; and processing structure processing the captured images to determine a location of the at least one pointer.

BRIEF DESCRIPTION OF THE DRAWINGS

Embodiments will now be described by way of example only with reference to the accompanying drawings in which.

DETAILED DESCRIPTION OF THE EMBODIMENTS

In the following, an interactive input system is described that comprises a display panel, a first illumination source providing illumination across an outer surface of the display panel such that when a pointer is brought into proximity with the outer surface, the pointer reflects illumination from the first illumination source through the display panel, at least one imaging device having a field of view aimed at an opposite outer surface of the display panel, the at least one imaging device capturing images including illumination reflected by the pointer through the display panel, the processing structure in communication with the at least one imaging device, said processing structure processing the captured images to determine a location of the pointer relative to the outer surface. The following description refers to one or more pointers being brought into proximity with the outer surface of the display panel. Those skilled in the art will appreciate that this includes a pointer brought into contact with the outer surface of the display panel as well as a pointer hovering above the outer surface of the display panel.

Figure 1:
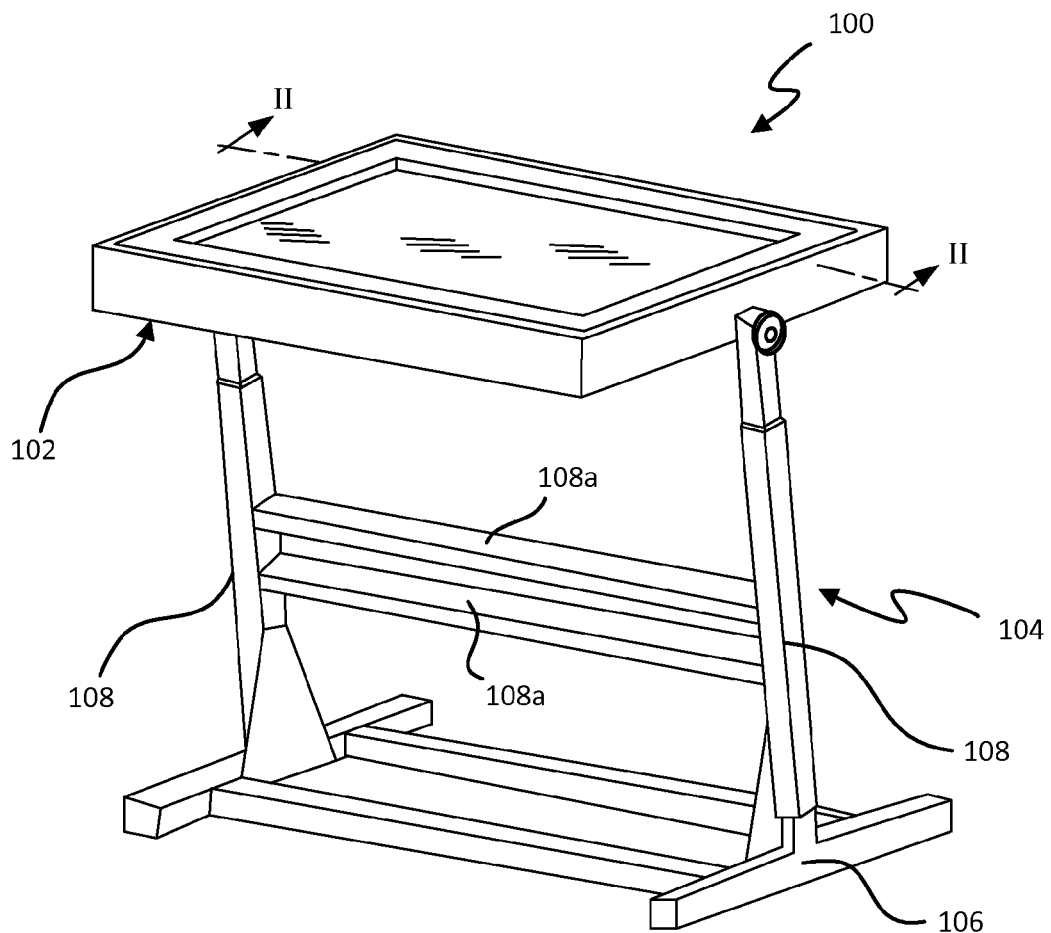
FIG. 1 is a perspective view of an interactive input system.

Turning now to FIG. 1, an interactive input system is shown and is generally identified by reference numeral 100. The interactive input system 100 comprises an input detection assembly 102 mounted on support structure 104 that supports the input detection assembly 102 above the ground or other surface on which the support structure 104 rests. Support structure 104 in this embodiment comprises a base 106 and a pair of laterally spaced, generally upright legs 108 mounted on the base 106. Vertically spaced, generally horizontal crossbars 108a extend between the legs 108. The input detection assembly 102 is positioned between and pivotably mounted to the legs 108 adjacent their upper ends allowing the input detection assembly 102 to rotate relative to the support structure 104 and assume different orientations. As illustrated, the input detection assembly 102 is in a generally horizontal orientation and is supported in a manner that allows a user to sit at the interactive input system 100 comfortably with their knees beneath the input detection assembly 102 unobstructed and tilt the input detection assembly to the desired user position.

Figure 2:
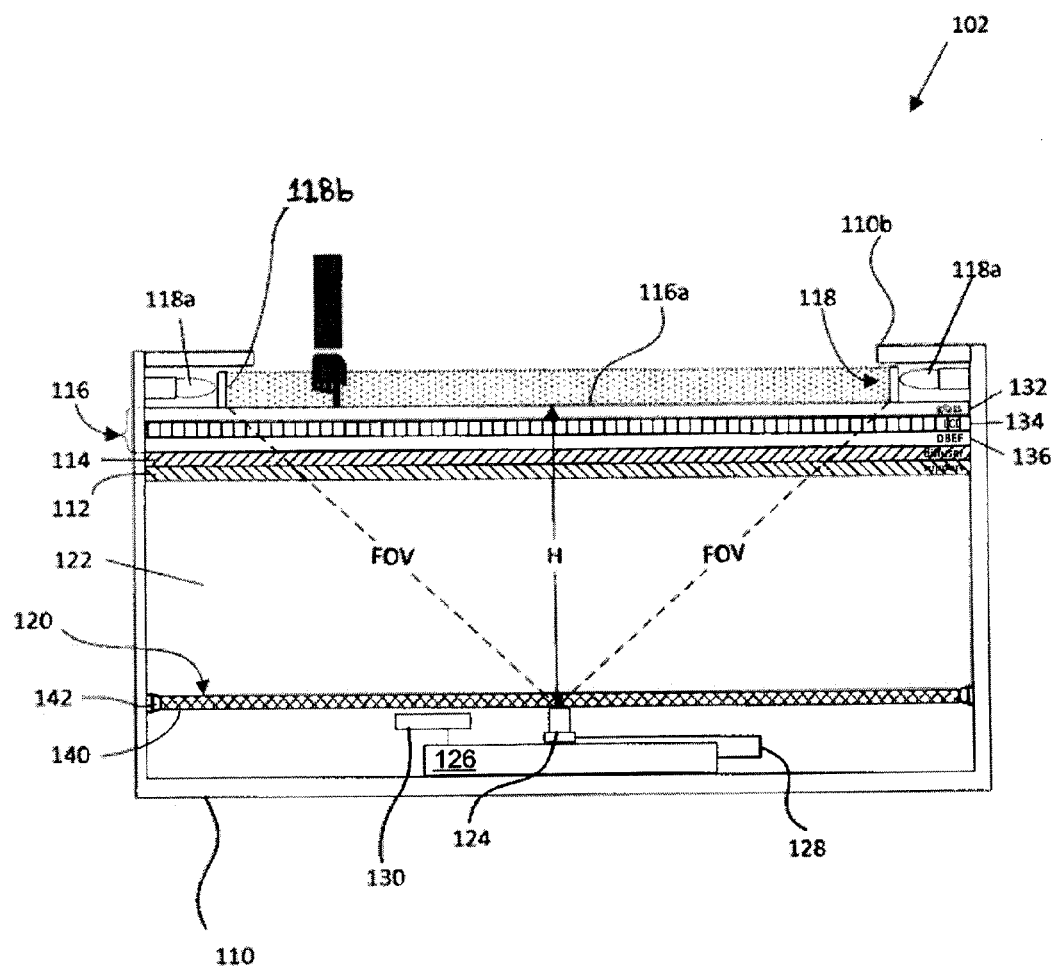
FIG. 2 is a cross-sectional view of an input detection assembly forming part of the interactive input system of FIG. 1.

FIG. 2 better illustrates the input detection assembly 102. As can be seen, in this embodiment input detection assembly 102 comprises a generally rectangular housing 110 having an opening 110a in its upper or forward major surface that is surrounded by a bezel 110b. The housing 110 accommodates a stacked arrangement of components positioned adjacent the opening 110a comprising, in the following order starting from furthest from the opening 110a, a support layer 112, a diffuser 114, a display panel 116 and an infrared (IR) illumination source 118. The IR illumination source 118 provides IR illumination generally across the display panel 116. In this embodiment, the support layer 112 is formed of transparent acrylic or other suitable light transmissive material. The diffuser 114 and display panel 116 are also light transmissive.

Positioned below the support layer 112 is a backlight illumination source 120 that provides backlight illumination to the display panel 116 in the form of visible light. In this embodiment, the backlight illumination source 120 is spaced from the support layer 112 thereby to define an interior space 122 within the housing 110. An imaging device 124 is positioned below the illumination source 120 and is spaced from the upper surface 116a of the display panel 116 by a viewing height H. The imaging device 124 is also oriented such that its field of view (FOV) is aimed at the bottom surface of the display panel 116. As the display panel 116, diffuser 114 and support layer 112 are light transmissive, the imaging device 124 is able to capture images of pointers brought into proximity with the upper surface 116a of the display panel 116. As will be appreciated, the terms "above", "below", and the like are relative terms that may change depending on the orientation and placement of the input detection assembly 102.

The imaging device 124 is connected to a general purpose computing device 126 via a data communication link such as a universal serial bus (USB) cable 128. The general purpose computing device 126 provides display data to a circuit block 130 which in turn provides the display data to the display panel 116 via an HDMI cable or other suitable connection (not shown). The display panel 116 in turn displays an image thereon. The general purpose computing device 126 processes image data captured by the imaging device 124 to detect one or more characteristics and the location of each pointer brought into proximity with the upper surface 116a of the display panel 116 and updates display data provided to the display panel 116, if appropriate, so that the image presented on display panel 116 reflects pointer activity. In this manner, pointer activity in proximity with the upper surface 116a of the display panel 116 can be recorded as writing or drawing or used to control execution of one or more application programs executed by the general purpose computing device 126.

The display panel 116 in this embodiment is a generally planar, liquid crystal display (LCD) panel comprising a layer of protection glass 132, a liquid crystal panel 134, and a brightness enhancing film 136 such as for example a dual brightness enhancing film (DBEF).

The IR illumination source 118 in this embodiment comprises a plurality of IR light emitting diodes (LEDs) 118a and a holographic diffuser 118b positioned beneath the bezel 110b. The LEDs 118a are positioned at spaced location about the periphery of the opening 110a. The holographic diffuser 118*b* also extends about the periphery of the opening 110*a*. The holographic diffuser 118*b* diffuses IR light rays emitted by the IR LEDs 118*a* such that at least a portion of the IR light rays exiting the diffuser 118*b* extend generally parallel to the upper surface 116*a* of the display panel 116. In this embodiment, the holographic diffuser 118*b* is of the type manufactured by Wavefront Technologies, Inc. of Paramount, Calif., USA, of the type manufactured by RPC Photonics, Inc., Rochester, N.Y., USA, or of the type manufactured by Fusion Optix Inc. of Woburn, Mass., USA. Of course, other suitable infrared diffusers may be employed.

The backlight illumination source 120 in this embodiment comprises a light guide 140 and a plurality of LEDs 142 positioned about the periphery of the light guide 140. The LEDs 142 emit visible light rays into the light guide 142, which in turn guides at least a portion of the visible light rays through the interior space 122 and support layer 112, towards the diffuser 114. The diffuser 114, in turn diffuses the visible light rays thereby to provide the display panel 106 with suitable backlighting and illuminate the image displayed thereon.

Interior space 122 defined between illumination source 120 and the support layer 112 is dimensioned so that that at least the entire upper surface 116*a* of the display panel 116 delimited by the opening 110*a* falls within the field of view FOV of the imaging device 124. In this manner, each pointer brought into proximity with the upper surface 116*a* of the display panel 116 will appear in captured images.

Figure 3:
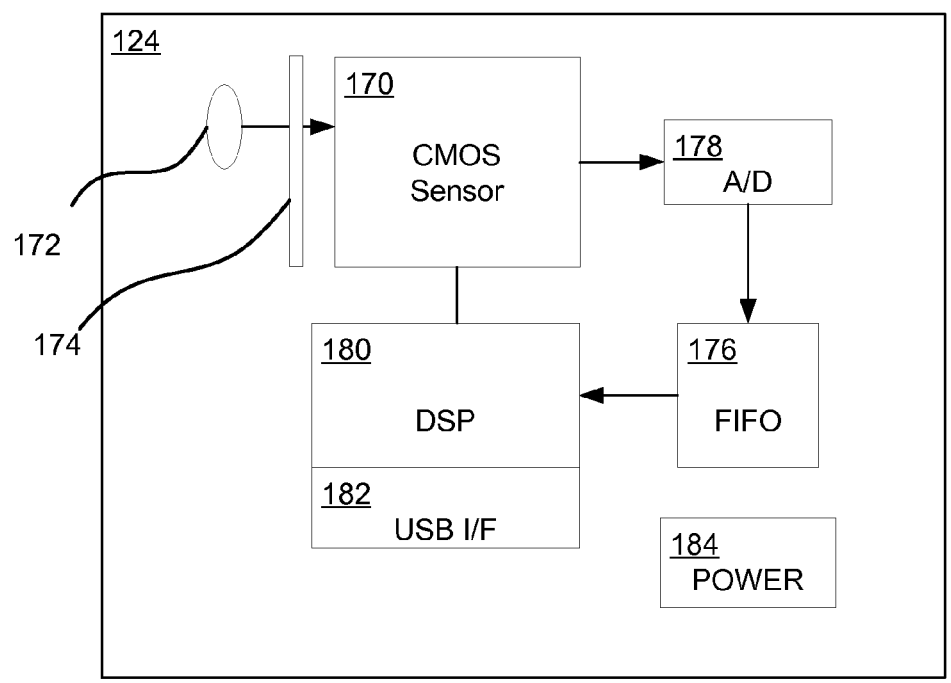
FIG. 3 is a schematic diagram of an imaging device forming part of the input detection assembly of FIG. 2.

FIG. 3 shows an exemplary schematic block diagram of components of the imaging device 124. As can be seen, imaging device 124 comprises a two-dimensional camera image sensor 170 such as for example a CMOS sensor, CCD sensor, etc., an associated lens assembly 172 and an IR filter 174 positioned intermediate the image sensor 170 and the associated lens assembly 172. The image sensor 170 is interconnected to a first-in-first-out (FIFO) buffer 176 via an analog-to-digital (A/D) convertor 178. The imaging device 124 also comprises a digital signal processor (DSP) 180, an input-output (I/O) interface 182 such as for example a USB port, as well as volatile and non-volatile memory (not shown). DSP 180 communicates image data acquired from the image sensor 170 to the general purpose computing device 126 via the I/O interface 182. The imaging device components receive power from a power-supply 184. As will be appreciated, the use of IR filter 174 allows IR illumination to pass through to the image sensor 170 while blocking out other wavelengths of illumination such as visible light.

In this embodiment, the imaging device 124 is a compact board level camera device manufactured by Imaging Development Systems GmbH of Oversulm, Germany under the part number UI-1226LE. The image sensor 170 is a CMOS image sensor configured for a 752×480 pixel sub-array that can be operated to capture image frames at high rates such as for example 60 to 100 frames per second or higher. The exposure time and frame rate of the imaging device 124 is controllable by the DSP 180 to permit operation in both dark rooms and well lit rooms.

General purpose computing device 126 in this embodiment is a personal computer or other suitable processing device or structure executing one or more applications programs. Thus, general purpose computing device 126 comprises, for example, a processing unit such as for example an Intel x86 based architecture, system memory (volatile and/or non-volatile), other non-removable and removable memory (e.g., a hard disk drive, RAM, ROM, EEPROM, CD-ROM, DVD, flash memory, etc.) and a system bus coupling the various components to the processing unit. The general purpose computing device 126 may also comprise a network connection to access shared or remote devices, one or more networked computing devices, and/or other network devices.

In this embodiment, the circuit block 130 comprises an interface circuit to receive display data and other input from the general purpose computing device 126 and a display driver circuit to output display data to the display panel 116.

The interactive input system 100 is able to detect pointers such as for example, a user's finger or fingers, a user's palm, a user's face, an eraser, a stylus, a cylinder or other suitable objects that are brought into proximity with the upper surface 116*a* of the display panel 116 as will now be described.

In the event one or more pointers are brought into proximity with the upper surface 116*a* of the display panel 116, IR illumination emitted across the upper surface 116*a* of the display panel 116 by IR illumination source 118 is reflected by each such proximate pointer. For each such proximate pointer, at least a portion of the reflected IR illumination is directed through the display panel 116, diffuser 114 and support layer 112 towards the imaging device 124. The redirected IR illumination impinging on the imaging device 124 is captured in acquired image frames. Image data of acquired image frames is sent to the general purpose computing device 126 via USB cable 128, where the image data is processed to determine one or more characteristics and the location of each pointer with respect to the upper surface 116*a* of the display panel 116.

In particular, the imaging device 124 captures image frames of the display panel 116 within the field of view of its image sensor 170 and associated lens assembly 172 at the frame rate established by the DSP clock signals. The general purpose computing device 126 polls the imaging device 124 at a set frequency (in this embodiment sixty (60) times per second) to obtain the image data. Each time the imaging device 124 is polled, image data is communicated to the general purpose computing device 126 for processing. If one or more pointers exist in captured image frames, the image data is processed to determine one or more characteristics (e.g., size, shape, etc.) of each pointer in proximity with the upper surface 116*a* of the display panel 116 as well as the location of each pointer, using known image processing routines such as for example blob detection and morphology operations (edge detection, binarization, etc.). The general purpose computing device 126 in turn adjusts display data output to the display panel 116 via the circuit block 130, if appropriate, such that the image presented on the display panel 116 reflects pointer activity.

Figure 4:
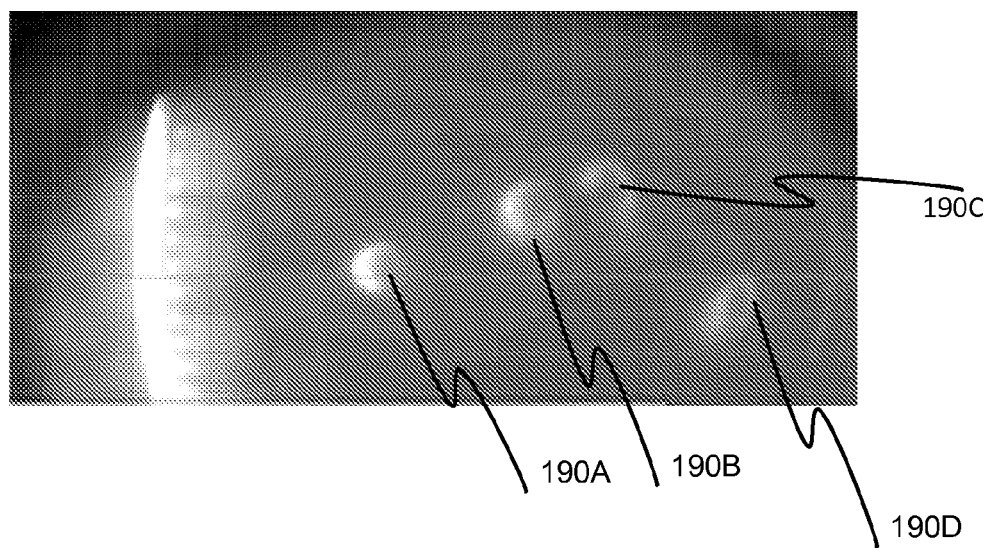
FIG. 4 is an exemplary image captured by the imaging device of FIG. 3.

An exemplary image frame captured by the imaging device 124 is shown in FIG. 4, in the event a user has brought four (4) fingers into proximity with the upper surface 116*a* of the display panel 116. As will be appreciated, each of the fingers reflects at least a portion of IR illumination emitted by the IR illumination source 118 towards the imaging device 124, where it is captured in acquired image frames. As a result, illuminated regions or shapes 190A to 190D corresponding to the fingers are clearly visible in the image frame. The image data that is sent to the general purpose computing device 126 is processed as described above to determine one or more characteristics of the fingers (e.g., size and/or shape) and the location of each of the fingers. Each of the illuminated regions or shapes is assigned an associated contact ID such that the movement of each of the fingers can be tracked individually. Also as described above, the general purpose computing device 126 adjusts the display data output to the display panel 116 via the circuit block 130 such that the image presented on the display panel 116 reflects the activity of the fingers. As will be appreciated, although the image frame shown in FIG. 4 is a single image frame, the imaging device 124 captures a series of image frames, which are communicated to the general purpose computing device 126 for processing where each image frame is compared to the previously processed image frame to determine pointer activity or movement.

Figure 5A:
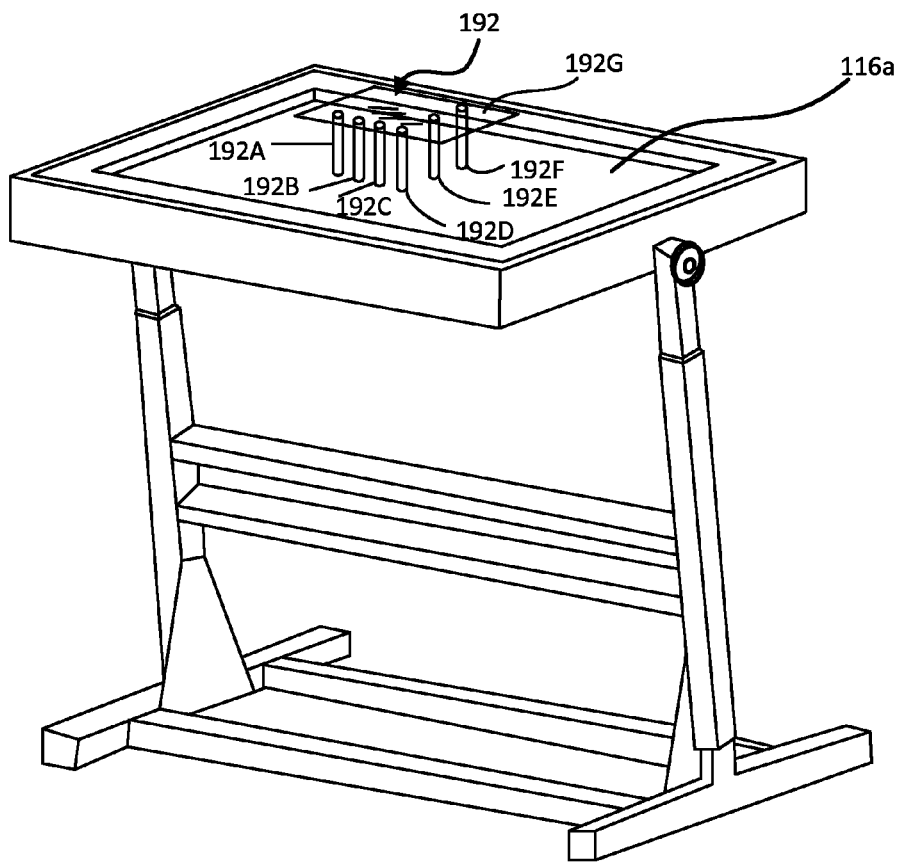
FIG. 5A is a perspective view of the interactive input system of FIG. 1 showing an object placed on a display surface thereof.
Figure 5B:
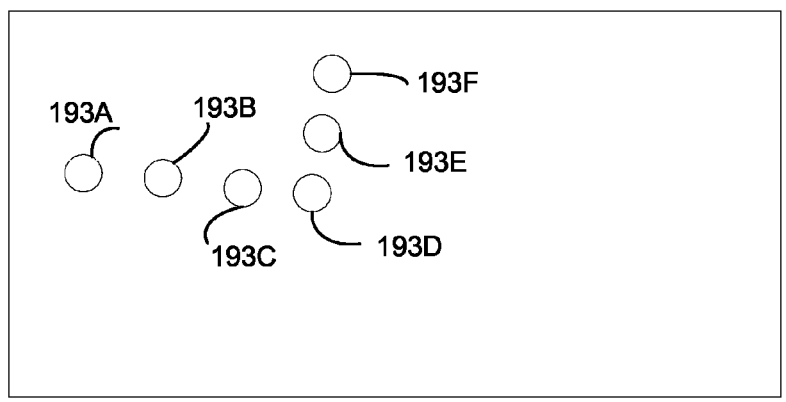
FIG. 5B is an exemplary image captured by the imaging device of FIG. 3 with the object shown in FIG. 5A on the display surface.

Another example of the interactive input system 100 detecting multi-touch input is shown in FIGS. 5A and 5B. In this example, an object 192 is placed on the upper surface 116a of the display panel 116. As can be seen in FIG. 5A, the object 192 comprises six (6) elongated legs 192A to 192F that depend from a plate 192G. Each leg is in contact with the upper surface 116a of the display panel 116. Similar to the fingers of FIG. 4 each leg 192A to 192F reflects at least a portion of IR illumination emitted by the IR illumination source 118 towards the imaging device 124, where it is captured in acquired image frames. FIG. 5B shows an exemplary image frame in which illuminated regions or shapes 193A to 193F corresponding to the legs 192A to 192F are clearly visible. The image data is sent to the general purpose computing device 126 as described previously to determine one or more characteristics of the legs (e.g. size and/or shape) and the location of the illuminated regions or shapes 193A to 193F and hence the legs 192A to 192F. Each of the illuminated regions or shapes is assigned an associated contact ID such that the movement of each of the legs 192A to 192F can be tracked individually.

Further specifics of simultaneously tracking the movement of a plurality of similarly shaped pointers are described in U.S. Provisional Patent Application 61/470,420 to Hill, et al. filed on Mar. 31, 2011 and entitled "Method for Manipulating a Graphical Object and an Interactive Input System Employing The Same", assigned to SMART Technologies ULC of Calgary, the entire content of which is incorporated herein by reference.

Figure 6A:
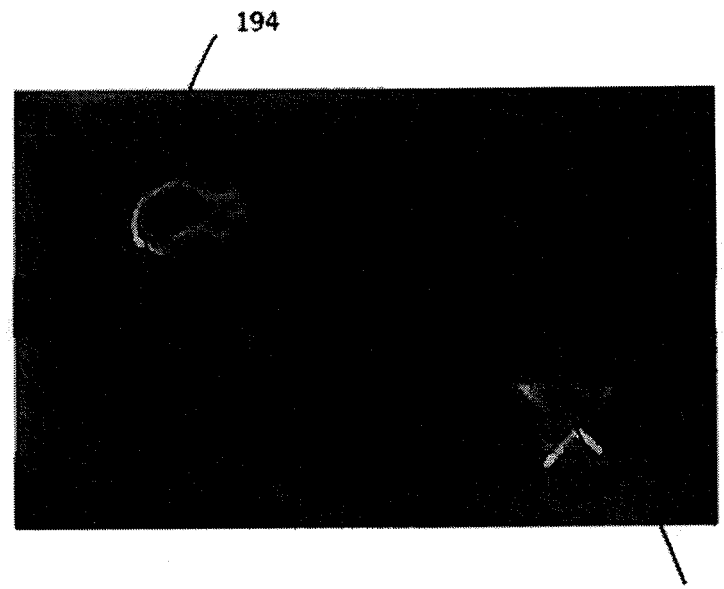
FIG. 6A is an exemplary raw image frame captured by the imaging device of FIG. 3.
Figure 6B:
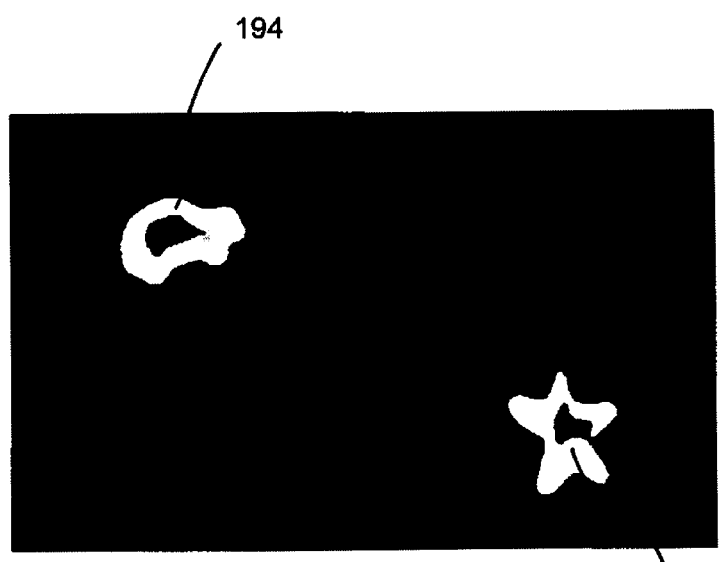
FIG. 6B is an exemplary output image after processing the raw image frame of FIG. 6A.

An example of the interactive input system 100 detecting two (2) objects having different shapes that are brought into proximity with the display panel 116 is shown in FIGS. 6A and 6B. When the objects are brought into proximity with the upper surface 116a of the display panel 116, each object reflects at least a portion of IR illumination emitted by the IR illumination source 118 towards the imaging device 124, where it is captured in acquired image frames. An exemplary image frame captured by the imaging device 124 is shown in FIG. 6A. As can be seen, the image frame comprises illuminated regions or shapes 194 and 196, each of which has a distinct shape corresponding to the shape of the respective object. Illuminated region or shape 194 is in the shape of a car while illuminated region or shape 196 is in the shape of a star. Image data is sent to the general purpose computing device 126 for processing as described previously to determine one or more characteristics of the objects (e.g., size and/or shape) and the location of each illuminated region or shape 194 and 196 and hence object. Since more than one illuminated region exists in the image frame, each illuminated region is also assigned an associated contact ID to allow movement of each object to be tracked. As one skilled in the art will appreciate, the utilization of known image processing techniques allow for interactive input system 100 to have shape recognition capabilities. FIG. 6B shows the image frame of FIG. 6A following shape recognition.

As noted above, the dimensions of the interior space 122 are selected to ensure that at least the upper surface 116a of the display panel 116 delimited by the opening 110a falls within the field of view of the imaging device 124. In embodiments where multiple imaging devices are used, the dimensions of the interior space 122 may be reduced, such that multiple imaging devices have overlapping fields of view to ensure that at least the entire surface 116a of the display panel 116 delimited by the opening 110a falls within the fields of view of the imaging devices. As the number of imaging devices used is increased, it will be appreciated that the dimensions of the interior space may be reduced. Consequently, the dimensions of the support structure 104 may be reduced. The number of imaging devices and the arrangement thereof depends on the focal length of the lens assembly used, as well as the associated field of view.

Figure 7:
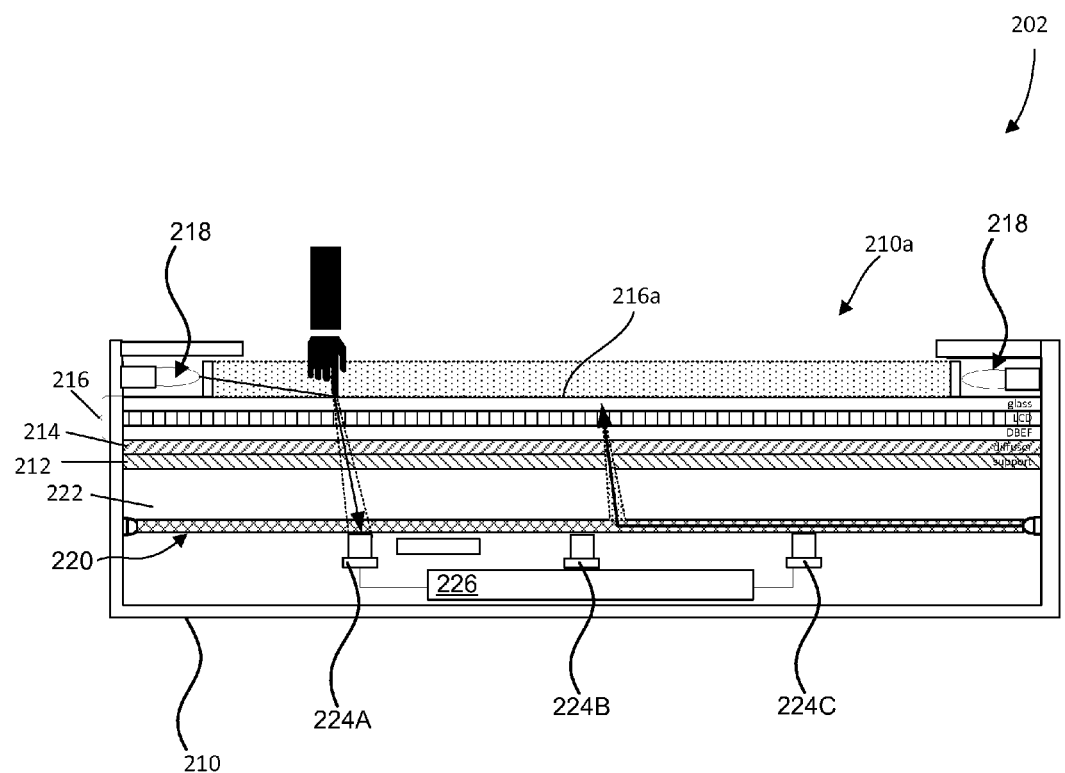
FIG. 7 is a cross-sectional view of another embodiment of an input detection assembly.
Figure 8:
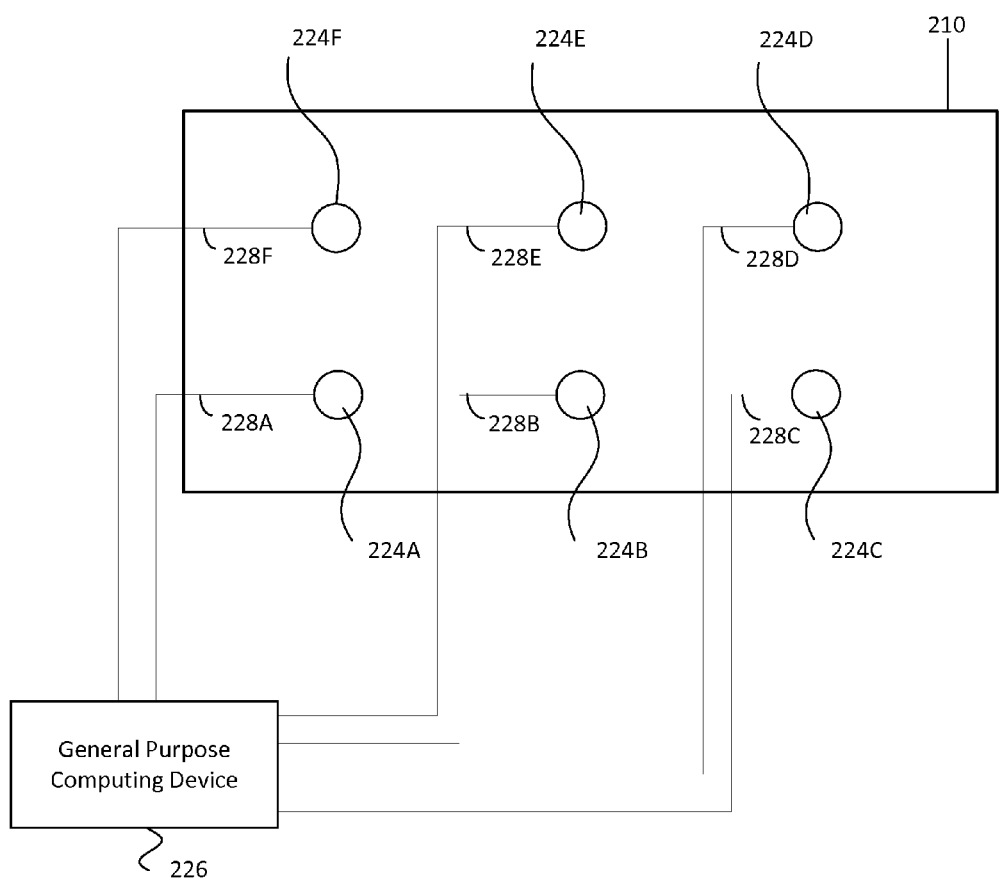
FIG. 8 is a plan view of a diffuser forming part of the input detection assembly of FIG. 7.

Turning now to FIGS. 7 and 8, another embodiment of an input detection assembly 202 for use in the interactive input system is shown. In this embodiment, like reference numerals will be used to indicate like components with "100" added for clarity. As can be seen, input detection assembly 202 is similar to that shown in FIG. 2, however in this case, the input detection assembly 202 comprises a plurality of imaging devices and in particular six (6) imaging devices 224A to 224F. In this embodiment, each of the imaging devices 224A to 224F is the same type as imaging device 124. The imaging devices 224A to 224F are connected to the general purpose computing device 226 via USB cables 228A to 228F respectively. As can be seen, illumination sources 218 and 220, display panel 216, diffuser 214 and support layer 212 are similar to that of input detection assembly 102 shown in FIG. 2, and thus specifics will not be described further.

The arrangement of the imaging devices 224A to 224F is shown in FIG. 8. As can be seen, the imaging devices 224A to 224F are positioned such that neighbouring imaging devices have partially overlapping fields of view to ensure that at least the entire upper surface 216a of the display panel 216 delimited by the opening 210a is imaged.

Figure 9:
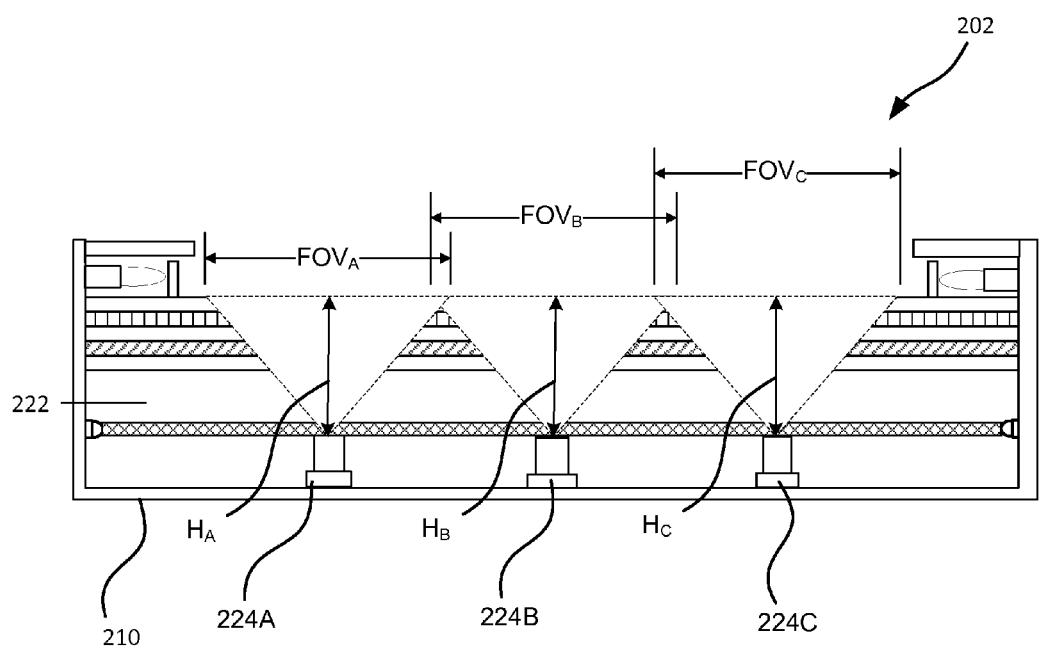
FIG. 9 is another cross-sectional view of the input detection assembly of FIG. 7 showing the field of view of imaging devices thereof.

FIG. 9 depicts a schematic diagram in cross-section illustrating the field of view FOV and viewing height H for imaging devices 224A, 224B and 224C. As can be seen, the imaging devices 224A, 224B and 224C are positioned such that the field of view of each imaging device ($FOV_A$, $FOV_B$, $FOV_C$, respectively) at least partially overlaps with the neighbouring imaging device(s). The field of view FOV of each of the imaging devices 224A, 224B, 224C defines the viewing height $H_A$, $H_B$, $H_C$, respectively, which in turn determines suitable dimensions for the interior space 222. As one skilled in the art will appreciate, for each imaging device, the focal length of the lens assembly 172 determines the field of view of the imaging device. For a given viewing height and image sensor, a lens assembly having a shorter focal length will lead to a wider field of view, and similarly, a lens assembly having a longer focal length will lead to a narrower field of view. The use of six (6) imaging devices having overlapping fields of view enables the dimensions of the interior space 222 and the housing 210 to be reduced, compared to the interior space 122 and housing 110 of the previous embodiment.

As will be appreciated, the operation of the input detection assembly 202 is similar to that of the input detection assembly 102. In the event one or more pointers are brought into proximity with the upper surface 216a of the display panel 216, IR illumination emitted by the IR illumination source 218 generally across the upper surface 216A of the display panel 216 is reflected by each pointer. Since the imaging devices 224A to 224F have partially overlapping fields of view to ensure that at least the entire upper surface 216a of the display panel 216 delimited by the opening 210a is imaged, at least a portion of the reflected IR illumination is directed towards at least one of the imaging devices 224A to 224F, where it is captured in acquired image frames. The image data is sent to the general purpose computing device 226 via the respective USB cables 228A to 228F, where the image data is processed to determine one or more characteristics of each pointer (e.g., size and/or shape) and the location of each pointer with respect to the display panel 216, using known image processing techniques such as for example blob detection and morphology operations (edge detection, binarization, etc.) as described previously. Also as described previously, the general purpose computing device 226 adjusts the display data output to the display panel 202 via the circuit block (not shown), if appropriate, such that the image presented on the display panel 216 reflects pointer activity.

Figure 10:
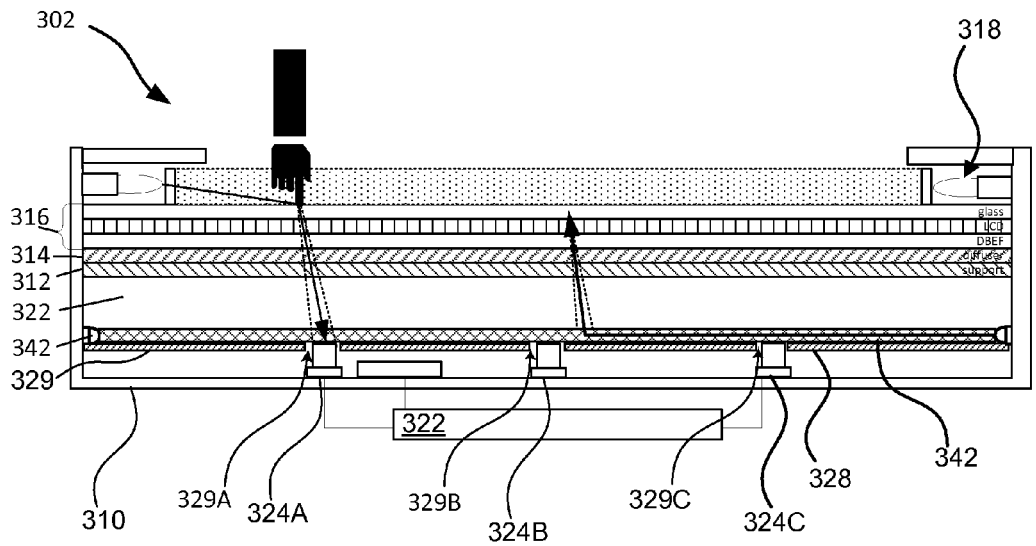
FIG. 10 is a cross-sectional view of yet another embodiment of an input detection assembly.
Figure 11:
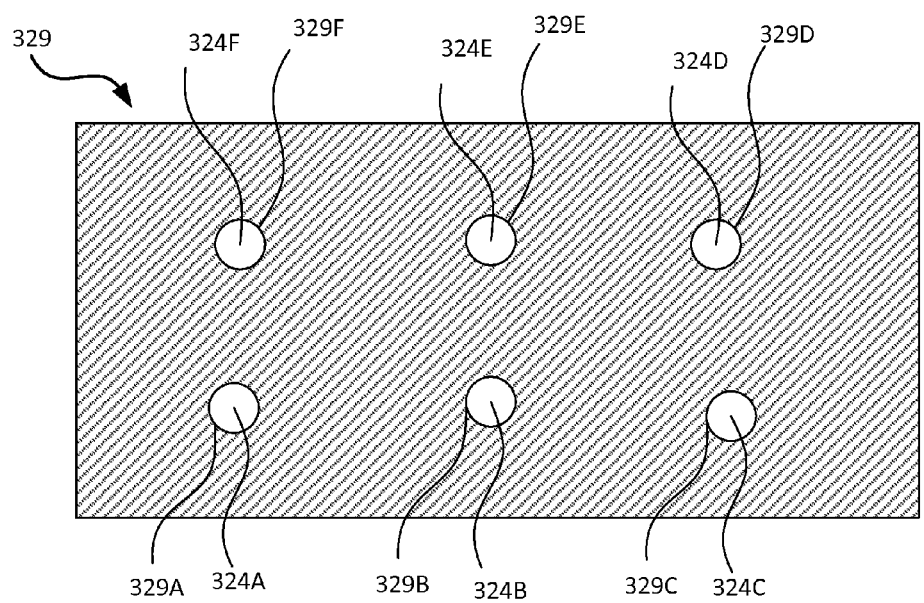
FIG. 11 is a plan view of a backlight reflector forming part of the input detection assembly of FIG. 10.

Turning now to FIGS. 10 and 11, yet another embodiment of an input detection assembly 302 is shown. In this embodiment, like reference numerals will be used to indicate like components of the first embodiment with a "200" added for clarity. As can be seen, input detection assembly 302 is similar to that of input detection assembly 202, with the exception that the input detection assembly 302 further comprises a backlight reflector 329 positioned beneath the light guide 340 of backlight illumination source 320. The backlight reflector 328 is provided with holes 329A to 329F corresponding to the locations of the imaging devices 324A to 324F, to ensure that the field of view of each of the imaging devices 320A to 320F is not obstructed by the backlight reflector 328. At least a portion of the visible light rays emitted by the LEDs 342 into the light guide 340 are guided through the interior space 322 and support layer 312, towards the diffuser 314. Backlight reflector 329 reflects at least a portion of the visible light rays that are not guided by the light guide 340 as described above so that these visible light rays pass through the light guide 340, interior space 322, support layer 312 towards the diffuser 314, to enhance the amount of visible backlight illumination provided to the display panel 316. The operation of input detection assembly 302 is similar to input detection assembly 202, and thus the specifics will not be described further.

Figure 12:
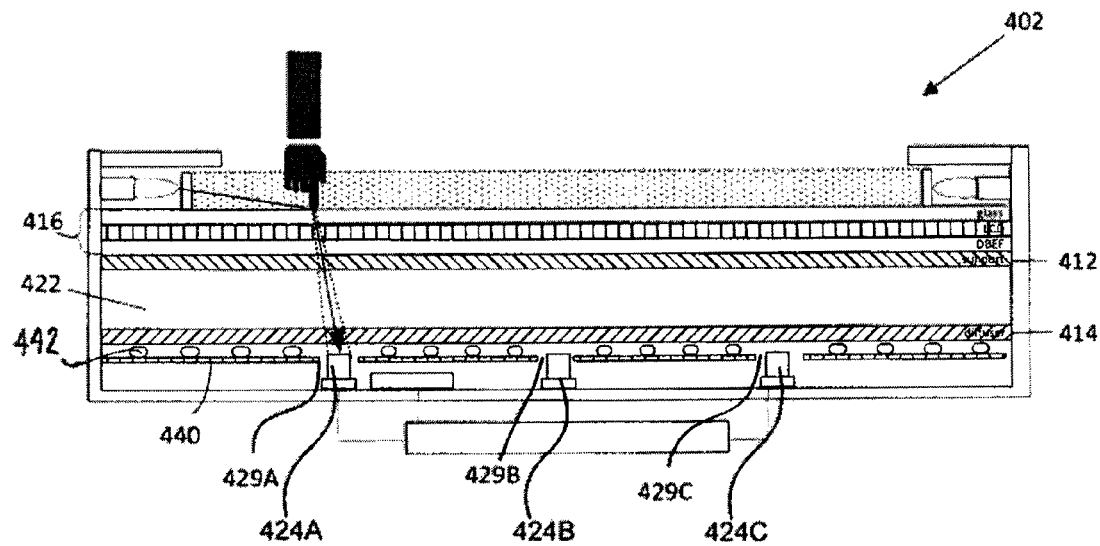
FIG. 12 is a cross-sectional view of yet another embodiment of an input detection assembly.
Figure 13:
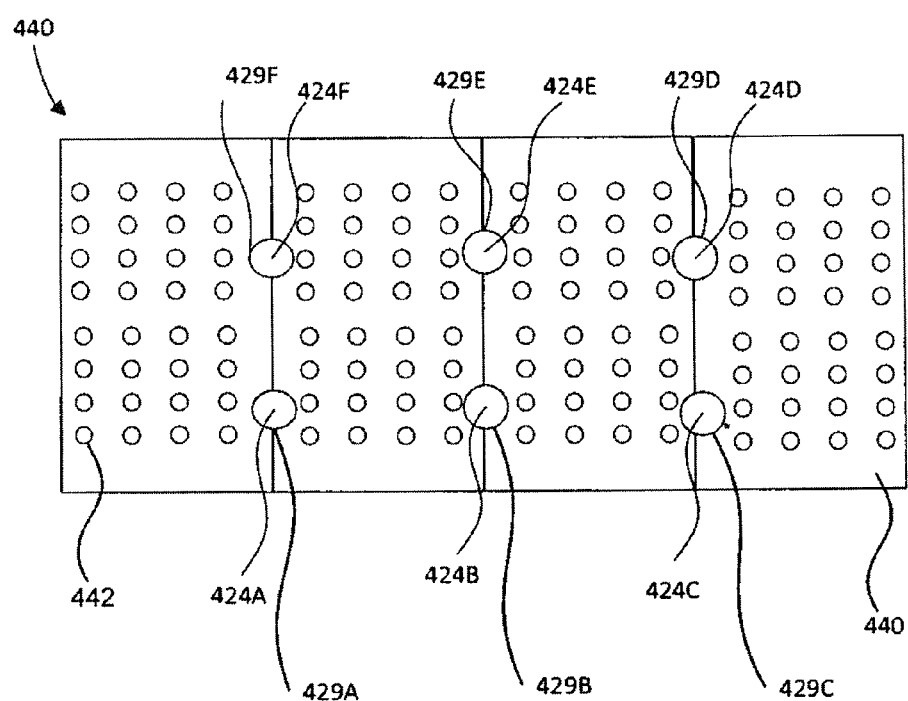
FIG. 13 is a plan view of a direct backlight board forming part of the input detection assembly of FIG. 12.

Turning now to FIGS. 12 and 13 another embodiment of an input detection assembly 402 is shown. In this embodiment, like reference numerals will be used to indicate like components of the first embodiment with a "300" added for clarity. As can be seen, input detection assembly 402 is similar to that of input detection assembly 302 with the exception that input detection assembly 402 comprises a backlight illumination source 420 in the form of a direct backlight board 440 positioned adjacent the imaging devices 424A to 424F. The diffuser 414 in this embodiment is positioned atop the direct backlight board 440 and the display panel 416 is disposed on the support layer 412. As best shown in FIG. 12, the direct backlight board 440 comprises an array of visible light LEDs 442. The LEDs 442 are configured to emit visible light rays generally upwards towards the diffuser 414. Once the visible light rays reach the diffuser 414, they are diffused before passing through interior space 422 and support layer 412 thereby to provide the display panel 416 with sufficient backlighting to illuminate the image displayed thereon. The direct backlight board 440 is provided with six (6) holes 429A to 429F corresponding to the locations of the imaging devices 424A to 424F, to ensure that the field of view of each of the imaging devices 424A to 424F is not obstructed. The operation of input detection assembly 402 is similar to input detection assembly 202, and thus the specifics will not be described further.

Figure 14:
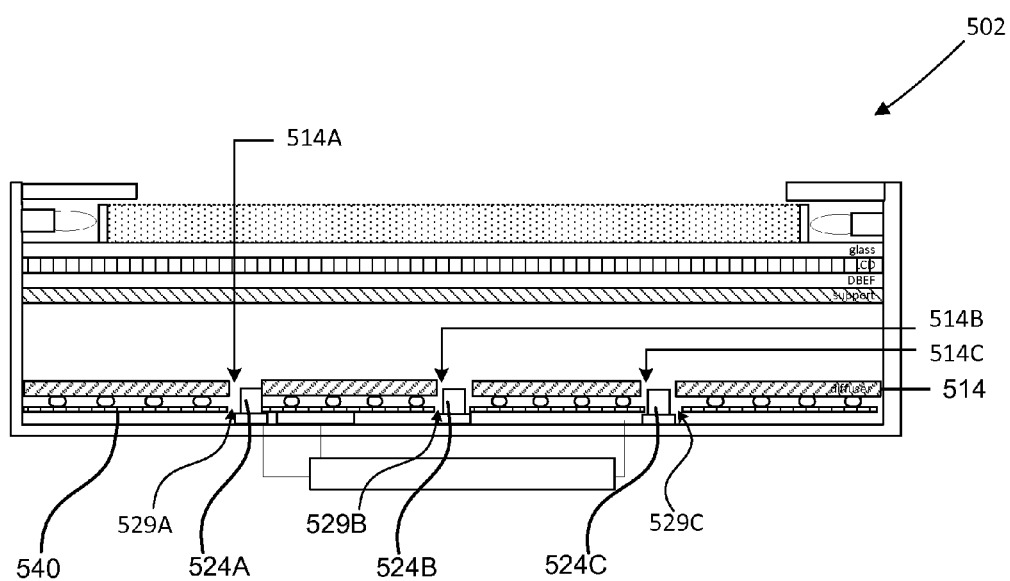
FIG. 14 is a cross-sectional view of yet another embodiment of an input detection assembly.

Turning now to FIG. 14, yet another embodiment of an input detection assembly 502 is shown. In this embodiment, like reference numerals will be used to indicate like components of the first embodiment with a "400" added for clarity. As can be seen, input detection assembly 502 is similar to that of input detection assembly 502 with the exception that the diffuser 514 is provided with six (6) holes 514A to 514F aligned with the holes 529A to 529F provided in the direct backlight board 540 and corresponding to the locations of the imaging devices 524A to 524F.

Figure 15:
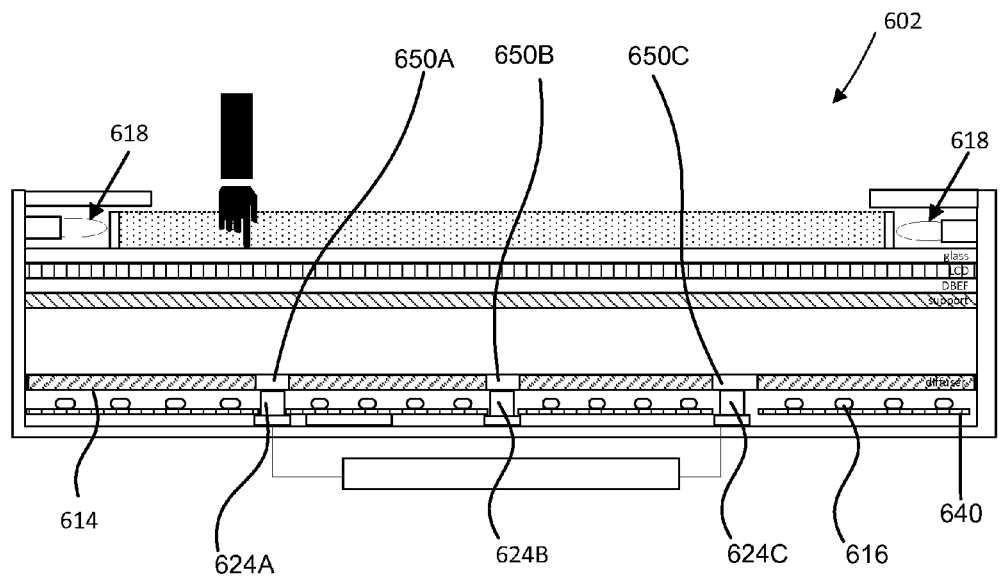
FIG. 15 is a cross-sectional view of yet another embodiment of an input detection assembly.

Turning now to FIG. 15, yet another embodiment of an input detection assembly 602 is shown. In this embodiment, like reference numerals will be used to indicate like components of the first embodiment with a "500" added for clarity. As can be seen, input detection assembly 602 is similar to that of input detection assembly 502 with exception that the holes provided in the diffuser 614 are covered by a film layer 650A to 650F having an electrically controllable transparency such as for example polymer dispersed liquid crystal (PDLC), the details of which will be described below. The input detection assembly 602 is operable in two modes, namely a display mode and an image capture mode. In the event that no image capture is desired, the input detection assembly 602 is operated in the display mode wherein the imaging devices 624A to 624F and the infrared illumination source 618 are turned OFF to conserve power, and the film layers 650A to 650F are operated as diffusive elements. In the event that image capture is desired, the input detection assembly 602 is operated in the image capture mode wherein the imaging devices 624A to 624F and the infrared illumination source 618 are turned ON, and the film layers 650A to 650F are conditioned to a transparent state by exciting film layers 650A to 650F via a power source 652 (see FIG. 16).

Figure 16:
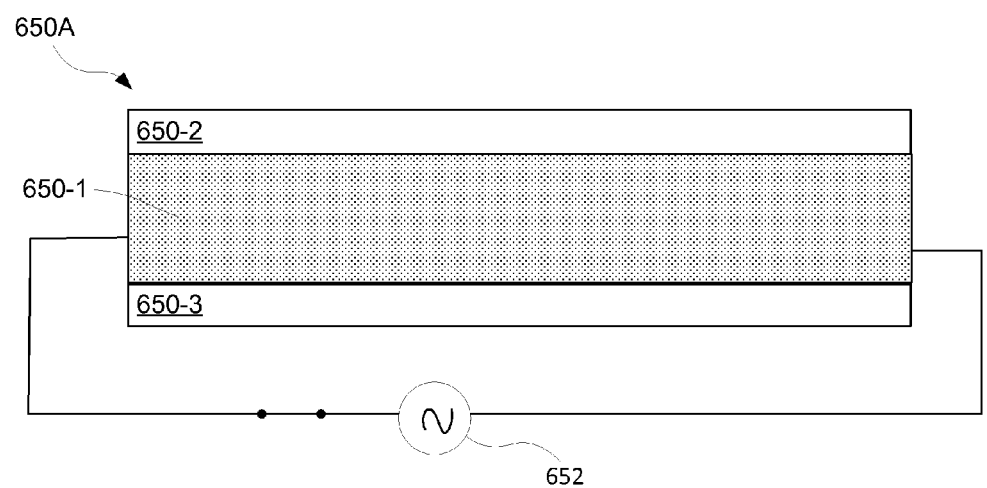
FIG. 16 is a cross-sectional schematic diagram of a film layer having an electrically controllable transparency forming part of the input detection assembly of FIG. 15.

FIG. 16 depicts a simplified cross-sectional diagram of one of the film layers 650A. In this embodiment, the film layer is a polymer-dispersed liquid crystal (PDLC) film comprising a layer 650-1 formed of liquid crystal droplets dispersed in a solid polymer matrix. The layer 650-1 is positioned intermediate a pair of parallel substrates 650-2, 650-3 that are coated with a thin layer of a conducting material such as indium tin oxide (ITO). The orientation of the liquid crystal droplets in the droplet layer 650-1 may be altered with controlled application of an electric field from power source 652. It is thus possible to controllably vary the intensity of transmitted light through the film layer 650A.

In the unexcited state, the liquid crystal droplets in layer 650-1 are oriented in random fashion and thus the film layer 650A acts as a diffusive element. An electric field applied from power source 652 causes the film layer 650A to operate in the excited state. In the excited state, the electric field applied from power source 652 orients the crystal droplets in a predetermined direction, such that the film layer becomes transparent. Thus, the film layer 650A allows light to pass through relatively unobstructed (i.e., becomes substantially transparent). As will be appreciated, the power source 652 may be selectively applied to the film layer 650A causing it to become transparent in the event the respective imaging device 624A is required to capture an image frame. When the imaging device 624A is not required to capture image frames, the power source 652 may be turned OFF, such that the film layer 650A may act as a diffusive element, diffusing visible light emitted from the LEDs 640. As will be appreciated, film layers 650B to 650F operate in the same manner as film layer 650A.

In the event input detection assembly 602 operates in the display mode, power source 652 is turned OFF causing film layers 650A to 650F to operate as diffusive elements, diffusing visible light emitted by the LEDs 640. As mentioned above, when in the display mode, the IR illumination source 618 and imaging devices 624A to 624F are powered OFF. In contrast, in the event input detection assembly 602, operates in the image capture mode, power source 652 applies an electric field to the film layers 650A to 650F, causing film layers 650A to 650F to become transparent. As will be appreciated, when in capture mode, the IR illumination source 618 and imaging devices 624A to 624F are powered ON. The selective application of power to the film layers 650A to 650F, the IR illumination source 618 and imaging devices 624A to 624F reduces the overall power requirements of interactive input system.

Figure 17:
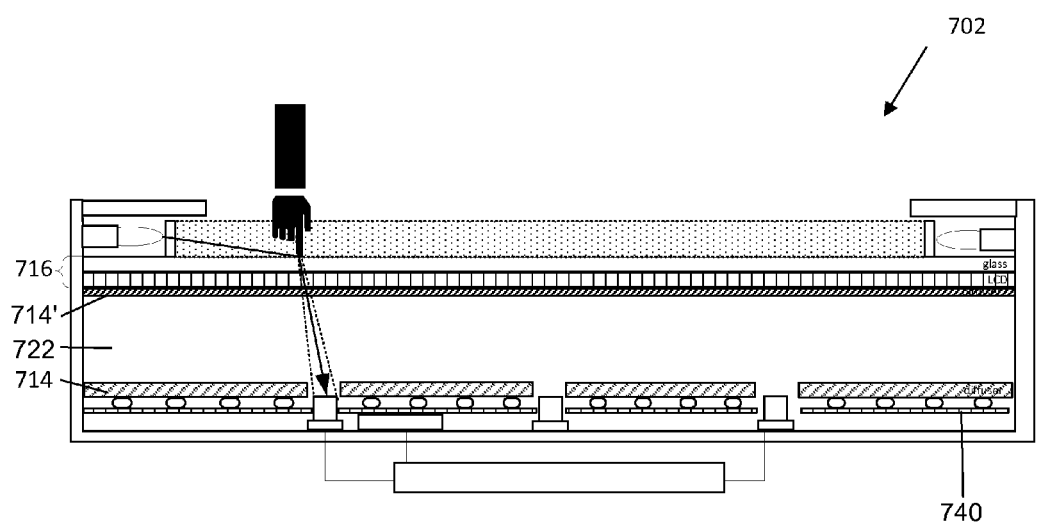
FIG. 17 is a cross-sectional view of still yet another embodiment of an input detection assembly.

Turning now to FIG. 17, still yet another embodiment of an input detection assembly 702 is shown. In this embodiment, like reference numerals will be used to indicate like components of the first embodiment with a "600" added for clarity. As can be seen, input detection assembly 702 is similar to that of input detection assembly 502 with the exception that the support layer 514 is replaced by a secondary diffuser 714'. As a result, in this embodiment, there is no requirement for the display panel 716 to comprise a brightness enhancing film. The secondary diffuser 714' is used to diffuse visible light emitted by the LEDs 740 and to provide support to the display panel 716.

Although the DSP of each imaging device is described as communicating image data acquired from the image sensor to the general purpose computing device, those skilled in the art will appreciate that the DSP may also be used for pre-processing the image data prior to communicating the image data to the general purpose computing device. For example, the DSP may pre-process the image data into data structures or packets containing pointer identifiers, location data, and contact state, which is then communicated to the general purpose computing device. In another embodiment, a master controller may be used to receive image data from each of the imaging devices and pre-process the image data prior to communicating the pre-processed image data to the general purpose computing device, as described in above-incorporated U.S. Pat. No. 6,803,906 to Morrison, et al.

As those skilled in the art will appreciate, each imaging device may have an adjustable shutter speed such that a user can determine the minimum shutter speed necessary to ensure pointers appearing in captured image frames can be resolved in varying ambient light conditions.

Although each imaging device is described as an IR imaging device, those skilled in the art will appreciate that other types of imaging devices may be used. For example, each imaging device may be a visible light imaging device, or a stereoscopic imaging device comprising at least a pair of imaging sensors.

Although embodiments are described where multiple IR imaging devices are used, those skilled in the art will appreciate that the multiple imaging devices may paired as stereoscopic imaging devices. Alternatively, the imaging devices may be configured such that at least two imaging devices have fields of view of any point on the display panel. As will be appreciated, in the event at least two imaging devices capture images of a pointer brought into proximity with the upper surface of the display panel, image processing techniques such as triangulation may be utilized to determine the location of the pointer with respect to the display panel as well as the distance of the pointer from the upper surface of the display panel (hereinafter referred to as depth information).

The interactive input system may also be further configured to utilize the depth information. For example, although the interactive input system is described as detecting pointers brought into proximity with the upper surface of the display panel, including pointers brought into contact with the display panel and pointers hovering above the display panel, those skilled in the art will appreciate that contact pointers and hover pointers may be interpreted differently by the general purpose computing device. For example, a range of 2 mm above the upper surface of the display panel may be defined as a touch region, and any distance above 2 mm from the upper surface of the display panel may be defined as a hover region. The upper boundary of the hover region will be the highest point above the upper surface of the display panel where illumination from the IR illumination source can be reflected by the pointer towards the imaging device.

Those skilled in the art will appreciate that the imaging devices may be used to read and resolve two-dimensional bar codes such as for example quick response (QR) codes displayed on a display screen of a pointer such as for example a mobile phone, a smart phone, a palm device, a personal digital assistant (PDA), a laptop PC, or other handheld device. In this embodiment, in the event such a pointer is brought into proximity with the display panel, the imaging device(s) capture(s) image data of the pointer, which includes an image of the QR code. The image data is pre-processed by the DSP of the imaging device(s) to interpret information contained within the QR code. The information is then communicated to the general purpose computing device to trigger an operation such as for example synchronizing of address books, downloading or uploading of files, photos, videos, music files, database operations, file sync, etc., to or from another computing device such as for example a tablet, a smartphone or other handheld device. As will be appreciated, the interpreting of the QR codes may be performed by a master controller in communication with the imaging device(s), within the general purpose computing device, etc.

Those skilled in the art will appreciate that the interactive input system may further communicate with a wireless device such as for example a mobile phone, a smart phone, a palm device, a personal digital assistant (PDA), a laptop PC, or other handheld device via wireless communication such as for example a wireless network, an ad-hoc peer to peer wireless network, a wireless communication protocol such as for example Bluetooth, etc. For example, the interactive input system may communicate with a handheld device having an operating system such as for example Notebook™ or embedded Senteo™ offered by SMART Technologies ULC installed therein. In this embodiment, the interactive input system may interact with the handheld device to provide classroom functionality such as for example student tests, real-time classroom polls, etc. Further, the interactive input system may interact with the handheld device to provide work-place functionality such as for example meeting voting, real-time meeting polls, etc.

In another embodiment, one or more three-dimensional (3D) imaging devices may be utilized for gesture based interaction. In this embodiment, pointer activity made proximate to the display panel is processed as gesture input and may augment or replace direct touch. Low cost imaging devices are used to obtain 3D images of pointer activity made proximate to the display panel and image processing techniques are employed to detect direct touch on the display panel, gesture activity made proximate to the display panel, or eye-gaze. In this embodiment, direct touch is employed using 3D displays such as those manufactured by Planar Systems Inc. Oregon U.S.A. that include two LCD monitors, oriented at a 110° angle and mounted on a specially designed stand. A passive beam-splitter mirror bisects the angle formed between the two LCD monitors. One side of the beam-splitter mirror has a reflective coating, and the other side has an anti-reflective coating to minimize secondary reflections. Imaging devices are overlaid on the bottom LCD monitor. This embodiment facilitates content creation and manipulation in 3D displays.

Augmented reality is complimentary to 3D display interaction. In another embodiment, multiple display panels, such as for example five or six display panels, may be employed to form a display cube.

As will be appreciated, thin cabinets for interactive input systems are desirable. In table formats, such as that shown in FIG. 1, users are permitted to get their knees underneath the input detection assembly unobstructed, such that the user may comfortably sit when using the interactive input system. In other embodiments, ascetically pleasing thin cabinets containing the input detection assembly may be wall-mounted or ceiling-mounted.

As will be appreciated, the housing of the input detection assemblies that accommodate multiple imaging devices can be made thinner by increasing the number of imaging devices therein. That is, the greater the number of imaging devices utilized, the thinner the housing dimensions can be made. Of course, the number and arrangement or distribution of imaging devices can be varied depending on the focal length of the lens used in the imaging devices, and the associated field of view. In one specific embodiment, for example, a housing thickness of 6 cm-10 cm can be achieved using a total number of six (6) to twenty (20) imaging devices.

Although the IR illumination source is described as comprising a plurality of IR LEDs extending about the periphery of the opening in the housing, those skilled in the art will appreciate that other configurations may be used. For example, in another embodiment, the IR LEDs may only extend about two (2) adjacent sides of the opening. In this embodiment, retro-reflective material extends along the remaining two (2) sides of the opening. Of course, other IR LED and retro-reflective arrangements are possible.

Although the visible backlight illumination source is described as comprising a light guide, those skilled in the art will appreciate that the light guide may be replaced by a light pipe. In another embodiment, the light guide uses printed light extraction or molded light extraction techniques to scatter at least a portion of the light rays passing therethrough towards the display panel in a substantially uniform manner.

Although the interactive input system is described as capturing image data to determine one or more characteristics and the location of each pointer brought into proximity with the upper surface of the display panel, those skilled in the art will appreciate that the interactive input system may only determine the location of each pointer or only one or more characteristics of each pointer. When the interactive input system is configured to distinguish between different types of pointers brought into proximity with the display panel, the input detection assembly may distinguish between two different types of pointers such as for example a user's finger and a user's palm by comparing the size of the detected pointer to a predefined threshold. In this embodiment, pointer activity made by a user's finger may be treated differently than pointer activity made by a user's palm such that the pointer activity may be recorded as writing or drawing or used to control execution of one or more application programs executed by the general purpose computing device. For example, pointer activity made by a user's finger may be used to annotate or write on the upper surface of the display panel. Conversely, a similar pointer activity, made by a user's palm may be used to erase the annotation or writing.

Those skilled in the art will appreciate that the input detection assemblies may be mounted within any type of support structure and may be oriented in any suitable manner. For example, the input detection assemblies may be mounted on a vertical support structure such as for example a wall or may be mounted within support structure similar to that of a drafting table wherein the angle of the display surface can be adjusted to accommodate the desire of the user.

Although the interactive input system is described as utilizing a single imaging device or six imaging devices, those skilled in the art will appreciate that any number of imaging devices may be used. As described above, increasing the number of imaging devices provides for decreased dimensions of the interior space, thereby reducing the dimensions of the overall interactive input system.

Although the general purpose computing device is described as utilizing blob detection and morphology operations (edge detection, binarization, etc.) to identify one or more characteristics and the location of pointers brought into proximity with the display panel, those skilled in the art will appreciate that other types of known image processing techniques may be used such as for example triangulation, and known morphology operations.

Although the LCD display panel is described as comprising a layer of protection glass, a liquid crystal panel, and a brightness enhancing film, those skilled in the art that further layers may also be used. For example, the liquid crystal panel may be disposed between a pair of polarizing films. Further, the liquid crystal panel may comprise one or more layers such as for example glass substrates, electrodes such as for example indium tin oxide electrodes, and thin film transistor arrays formed on a substrate, a color filter, and a mirror.

Although the display panel is described as being an LCD display panel, those skilled in the art will appreciate that other types of display panels may be used such as for example a high definition LCD display panel, a light emitting diode (LED) display panel, an organic light emitting diode (OLED) display panel, a plasma display panel, and the like.

Although the imaging devices are described as being connected to the general purpose computing device via a USB cable, those skilled in the art will appreciate that other wired or wireless peripheral interconnects and corresponding hubs, protocols, cables and the like may be used.

Although embodiments have been described above with reference to the accompanying drawings, those of skill in the art will appreciate that variations and modifications may be made without departing from the scope thereof as defined by the appended claims.

What is claimed is:

1. An interactive input system comprising:
   a liquid crystal display panel;
   a first illumination source configured to provide a sheet of illumination across and contiguous with an exterior outer surface of the display panel such that when a pointer is brought into proximity with the outer surface and into the sheet of illumination, the pointer reflects illumination of the sheet of illumination through the display panel;
   a second illumination source configured to provide illumination to an opposite exterior outer surface of the display panel thereby to backlight said display panel;
   a plurality of imaging devices arranged at spaced locations proximate to but spaced from the opposite exterior outer surface of the display panel, each imaging device having a field of view aimed at an associated sub-region of the opposite exterior outer surface of the display panel with the fields of view of neighboring imaging devices partially overlapping, the imaging devices configured to capture images including the illumination reflected by the pointer through the display panel;
   processing structure in communication with the imaging devices, said processing structure configured to process the captured images to determine a location of the pointer relative to the exterior outer surface of the display panel, wherein the number of imaging devices and dimensions of the sub regions are selected to reduce dimensions of the interactive input system; and a reflector positioned between the second illumination source and the imaging devices, the reflector having apertures corresponding to locations of the imaging devices and having a reflective surface facing the opposite exterior outer surface of the display panel, the reflective surface configured to reflect illumination impinging thereon to the opposite exterior outer surface of the display panel.

2. The interactive input system of claim 1 wherein the first illumination source is an infrared illumination source.

3. The interactive input system of claim 2 wherein the first illumination source comprises at least one infrared light emitting diode (LED).

4. The interactive input system of claim 3 wherein the at least one LED comprises a plurality of infrared LEDs.

5. The interactive input system of claim 4 wherein the infrared LEDs are positioned about the periphery of the exterior outer surface of the display panel.

6. The interactive input system of claim 5 wherein the infrared LEDs are positioned below a bezel extending about the periphery of the exterior outer surface of the display panel.

7. The interactive input system of claim 2 wherein the first illumination source further comprises a diffuser.

8. The interactive input system of claim 7 wherein the diffuser is one of an infrared diffuser and a holographic diffuser.

9. The interactive input system of claim 4 wherein the infrared LEDs are positioned along at least one side of the display panel and wherein a retro-reflective surface substantially normal to the exterior outer surface of the display panel extends along each side of the display panel opposite infrared LEDs.

10. The interactive input system of claim 2 wherein each imaging device is an infrared imaging device.

11. The interactive input system of claim 1 wherein the illumination provided by the second illumination source is visible light.

12. The interactive input system of claim 11 wherein the display panel is supported by support structure.

13. The interactive input system of claim 12 wherein the display panel is supported horizontally by the support structure.

14. The interactive input system of claim 11 wherein the display panel, second illumination source and the imaging devices are accommodated by a housing.

15. The interactive input system of claim 14 further comprising at least one diffuser positioned between the display panel and the imaging devices to diffuse illumination provided by the second illumination source to the opposite exterior outer surface of said display panel.

16. The interactive input system of claim 15 wherein the at least one diffuser is positioned adjacent the display panel or adjacent the imaging devices.

17. The interactive input system of claim 16 comprising a pair of diffusers, one of said diffusers being positioned adjacent the display panel and the other of said diffusers being positioned adjacent the second illumination source.

18. The interactive input system of claim 16 wherein the at least one diffuser when positioned adjacent the imaging devices comprises openings axially aligned with the imaging devices.

19. The interactive input system of claim 18 wherein the openings are covered by a layer of polymer-dispersed liquid crystal film.

20. The interactive input system of claim 19 wherein the polymer-dispersed liquid crystal film is in electrical communication with a power source.

21. A method comprising:
the interactive input system of claim 20 wherein each imaging device is spaced from the opposite exterior outer surface of the display panel by a distance between about 6 cm to 20 cm and wherein the plurality of imaging devices comprises between six imaging devices and twenty imaging devices.

22. The interactive input system of claim 14 wherein the processing structure is accommodated by the housing.

23. The interactive input system of claim 14 wherein the processing structure is positioned outside the housing.

24. A method comprising:
providing a sheet of illumination generally across and contiguous with an exterior outer surface of a liquid crystal display panel using a first illumination sources positioned about the periphery of the liquid crystal display panel;

providing illumination using a second illumination source to an opposite exterior outer surface of said display panel thereby to backlight said display panel;

capturing images of a pointer brought into proximity with the exterior outer surface and into the sheet of illumination, using a plurality of imaging devices proximate to but spaced from the opposite exterior outer surface of the display panel, each imaging device having a field of view aimed at an associated sub-region of the opposite exterior outer surface of the display panel with the fields of view of neighboring imaging devices partially overlapping, as a result of illumination from the sheet of illumination provided by the first illumination sources being reflected by the pointer towards the imaging devices;

reflecting illumination using a reflector positioned between the second illumination source and the imaging devices, the reflector having apertures corresponding to locations of the imaging devices and having a reflective surface facing the opposite exterior outer surface of the display panel, the reflective surface configured to reflect illumination impinging thereon to the opposite exterior outer surface of the display panel;

processing the captured images to determine a location of the pointer.

25. The method of claim 24 further comprising processing the captured images to determine at least one characteristic of the pointer.

26. The method of claim 25 wherein the at least one characteristic is at least one of a size of the pointer and a shape of the pointer.

27. The method of claim 25 wherein processing the captured images comprises performing at least one of blob detection and morphology operations.

28. The method of claim 24 wherein the capturing is performed only in an image capture mode.

29. The method of claim 28 wherein the first illumination source only provides illumination across and contiguous with the exterior outer surface of the display panel during the image capture mode.

30. An interactive input system comprising:

a liquid crystal display panel;

at least a first illumination source configured to provide a sheet of illumination across and contiguous with an exterior outer surface of the display panel;

at least a second illumination source configured to provide backlight illumination to an opposite exterior outer surface of the display panel;

a plurality of imaging devices arranged at spaced locations proximate to but spaced from the opposite exterior surface of the display panel, each imaging device having a field of view aimed at a respective portion of the opposite exterior outer surface with the fields of view of neighboring imaging devices partially overlapping, at least one of said imaging devices configured to capture images of at least one pointer brought into proximity with the exterior outer surface of the display panel and into the sheet of illumination as a result of illumination from the sheet of illumination provided by the first illumination source being reflected by the pointer through the display panel and towards the imaging devices;

processing structure configured to process the captured images to determine a location of the at least one pointer;

a reflector positioned between the second illumination source and the imaging devices, the reflector having apertures corresponding to locations of the imaging devices and having a reflective surface facing the opposite exterior outer surface of the display panel, the reflective surface configured to reflect illumination impinging thereon to the opposite exterior outer surface of the display panel; and a housing at least accommodating the display panel, first illumination source, second illumination source, reflector and imaging devices, the number of imaging devices and the respective portion dimensions being selected to reduce the dimensions of said housing.

31. An interactive input system comprising:

a liquid crystal display panel;

a first illumination source configured to provide a sheet of illumination across and contiguous with an exterior outer surface of the display panel such that when a pointer is brought into proximity with the outer surface and into the sheet of illumination, the pointer reflects illumination of the sheet of illumination through the display panel;

a second illumination source configured to provide illumination to an opposite exterior outer surface of the display panel thereby to backlight said display panel;

a plurality of imaging devices arranged at spaced locations proximate to but spaced from the opposite exterior outer surface of the display panel, each imaging device having a field of view aimed at an associated sub-region of the opposite exterior outer surface of the display panel with the fields of view of neighboring imaging devices partially overlapping, the imaging devices configured to capture images including the illumination reflected by the pointer through the display panel; and processing structure in communication with the imaging devices, said processing structure configured to process the captured images to determine a location of the pointer relative to the exterior outer surface of the display panel and to determine whether the pointer is a hover pointer or a touch pointer, wherein the number of imaging devices and dimensions of the sub regions are selected to reduce dimensions of the interactive input system, and wherein pointers above a threshold distance from the outer surface of the display panel and in the sheet of illumination are hover pointers and pointers at or below the threshold distance from the outer surface of the display panel are touch pointers.

32. The interactive input system of claim 31, wherein the threshold distance is approximately 2 mm.

* * * * *